(12) United States Patent
Hardcastle

(10) Patent No.: US 7,913,308 B1
(45) Date of Patent: Mar. 22, 2011

(54) SECURE REMOTE REFERENCING OF A NETWORKED OBJECT OF SERVICE

(75) Inventor: Michael J. Hardcastle, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1542 days.

(21) Appl. No.: 11/263,680

(22) Filed: Oct. 31, 2005

(51) Int. Cl.
*G06F 7/04* (2006.01)
*G06F 17/30* (2006.01)
*H04N 7/16* (2006.01)

(52) U.S. Cl. .......... 726/26; 713/167; 713/193; 709/225; 380/247; 380/248; 380/249; 380/250

(58) Field of Classification Search ............ 726/26
See application file for complete search history.

(56) References Cited

U.S. PATENT DOCUMENTS

| | | | |
|---|---|---|---|
| 5,832,487 A * | 11/1998 | Olds et al. ............... | 1/1 |
| 5,946,681 A * | 8/1999 | Shorter ................. | 1/1 |
| 6,049,819 A * | 4/2000 | Buckle et al. ............ | 709/202 |
| 6,625,603 B1 * | 9/2003 | Garg et al. .............. | 707/758 |
| 7,330,830 B1 * | 2/2008 | Lamoureux et al. ........ | 705/34 |
| 2002/0065875 A1 * | 5/2002 | Bracewell et al. ........ | 709/203 |
| 2003/0105735 A1 * | 6/2003 | Kukura et al. ............ | 707/1 |
| 2004/0133793 A1 * | 7/2004 | Ginter et al. ............ | 713/193 |
| 2005/0004978 A1 * | 1/2005 | Reed et al. ............. | 709/203 |
| 2005/0071354 A1 * | 3/2005 | Cameron et al. .......... | 707/100 |
| 2006/0095467 A1 * | 5/2006 | Krueger et al. ........... | 707/103 X |
| 2006/0173985 A1 * | 8/2006 | Moore ................. | 709/223 |

OTHER PUBLICATIONS

OceanStore: An Architecture for Global-Scale Persistent Storage; John Kubiatowicz et al.; ASPLOS 2000 Cambridge, MA Nov. 12-15, 2000; pp. 190-201; URL:http://delivery.acm.org/10.1145/360000/357007/p190- kubiatowicz.pdf?key1=357007&key2=7696245721 &coll=GUIDE&dl=GUIDE&CFID=92416999 &CFTOKEN=22397177.*

* cited by examiner

*Primary Examiner* — Thanhnga B Truong
*Assistant Examiner* — Mahfuzur Rahman

(57) ABSTRACT

A solution for a remote service provider outside a customer's controlled network to reference an object of service (OOS) that is part of the customer's controlled network using a globally unique identifier (GUID) which is derived independently of network information associated with the OOS. A GUID generator module within the customer's controlled network generates a GUID for each device in the customer's controlled network and stores each GUID with a reference to its network information (e.g., IP addresshost name) in a lookup datastore accessible by an object of service management system (OOS) within the customer's controlled network. For service instances (e.g., data harvesting, software upgrades), the OOS management module sends the GUID in lieu of network information for the OOS. Thus the remote service provider can uniquely identify a device and reference it in a customer's network without the security implications of transferring customer network information outside the customer's network.

17 Claims, 2 Drawing Sheets

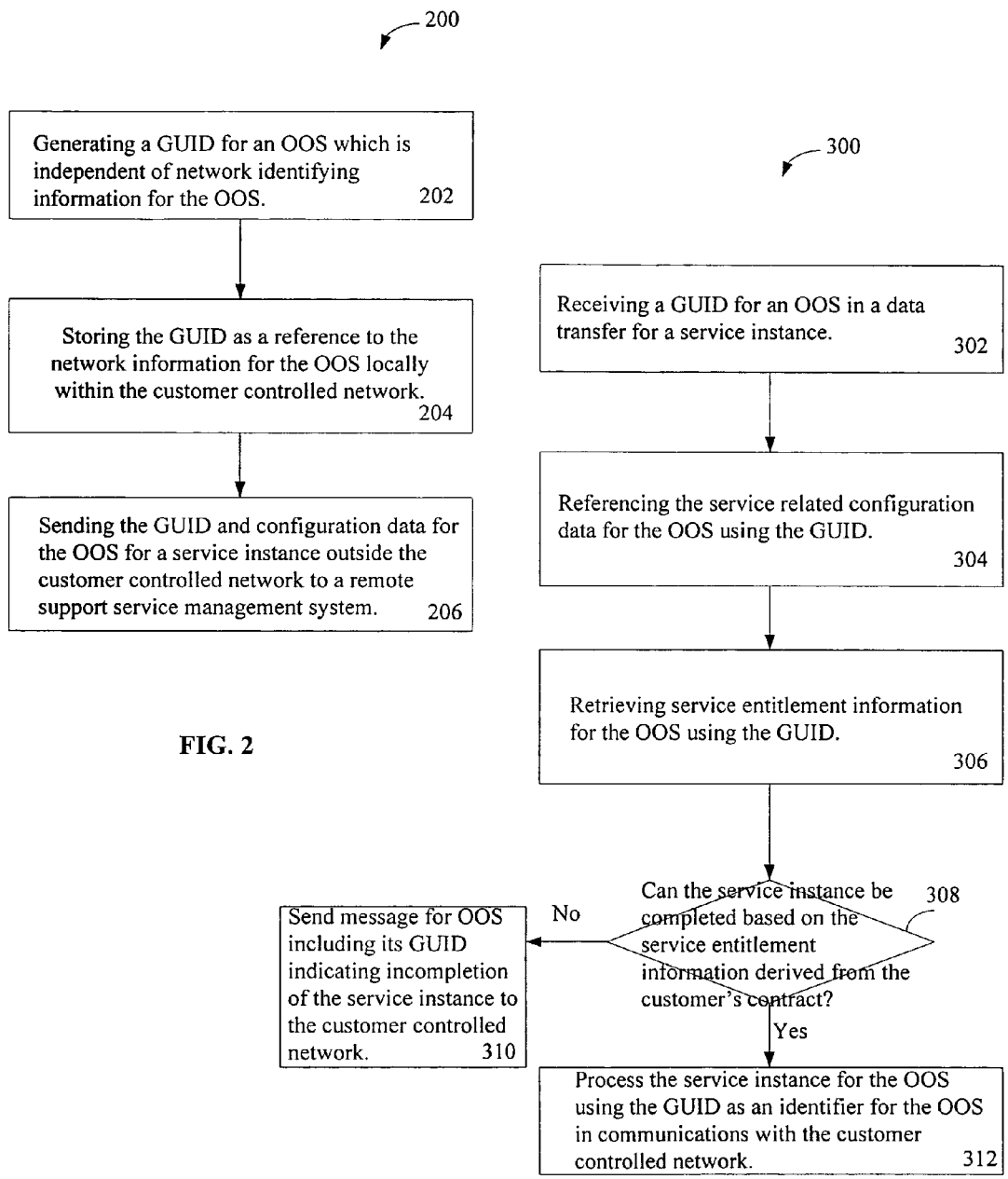

US 7,913,308 B1

SECURE REMOTE REFERENCING OF A NETWORKED OBJECT OF SERVICE

BACKGROUND

Field of the Invention

The invention generally relates to security of network information for customer networks and networked devices being remotely serviced over a network.

Remote service support of a customer network saves money by not requiring or requiring less information technology (IT) personnel to be located on the customer's premises to service the customer's network, their systems, and peripherals. Not all customers take advantage of remote service support, however, due to network security concerns. In particular, there is a class of customers that do not want their IP addresses and hostnames transmitted outside the customer network, for example over the Internet, to the computer systems of a remote service support provider, nor does this class of customers want the service provider to store their IP addresses and hostnames remotely. They are concerned about the security implications of this information getting intercepted or released and exposing their network designs and systems to hacking attempts. This is problematic for a remote support service provider which offers services such as data harvesting and collection, firmware upgrades, and the enablement of new features or services which typically use IP addresses and host names to identify the specific devices whose data is to be harvested or which is to receive an upgrade or new feature.

A solution which can uniquely identify a device and reference it through the customer's site while still respecting the customer's requirement that no IP addresses or hostnames be transmitted to the remote service provider's network or stored by the remote service provider is highly desirable.

SUMMARY

The present invention provides one or more solutions for secure remote referencing by a service provider of an object of service (OOS) controlled within a customer controlled network using a globally unique identifier (GUID). An object of service is a networked device or network entity (e.g., network partition) which can be identified by a network identifier such as an IP address and/or a hostname, or some peripheral device connected to a networked device or network entity.

A system for secure remote referencing by a service provider of an object of service (OOS) controlled within a customer controlled network in accordance with an embodiment of the present invention from the perspective of the customer controlled network comprises a globally unique identifier (GUID) generator module which generates a GUID for each OOS which is independent of network identifying information for the OOS. The GUID generator module references the GUID to its network information in a GUID network information lookup datastore stored in a memory protected from unauthorized access by security features of the customer controlled network. An OOS management module operating within the customer controlled network having access to the GUID network information lookup datastore sends a GUID for an OOS outside the customer controlled network for a service instance to the remote service provider and matches a GUID received from the remote service provider with its corresponding OOS based on the GUID network information lookup datastore.

A method for secure remote referencing by a service provider of an object of service (OOS) controlled within a customer controlled network in accordance with an embodiment of the present invention comprises generating a GUID for an OOS which is independent of network identifying information for the OOS, storing the GUID as a reference to the network information for the OOS locally within the customer controlled network, and sending the GUID for a service instance for the OOS outside the customer controlled network to a remote support service management system.

A method for secure remote referencing of an OOS in a customer controlled network by a remote support service provider in accordance with an embodiment of the present invention comprises receiving a GUID for the OOS in a data transfer for a service instance, referencing the service related configuration data for the OOS in a local datastore using the GUID and processing the service instance for the OOS using the GUID as an identifier for the OOS in communications with the customer controlled network.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2 is a flowchart diagram of a method for assigning a globally unique identifier (GUID) to an object of service (OOS) for secure servicing by a remote service provider over a network in accordance with an embodiment of the present invention.

FIG. 3 is a flowchart diagram of a method for secure remote referencing by a service provider for an object of service (OOS) within a customer controlled network based on a globally unique identifier (GUID) in accordance with an embodiment of the present invention.

Figure 1:
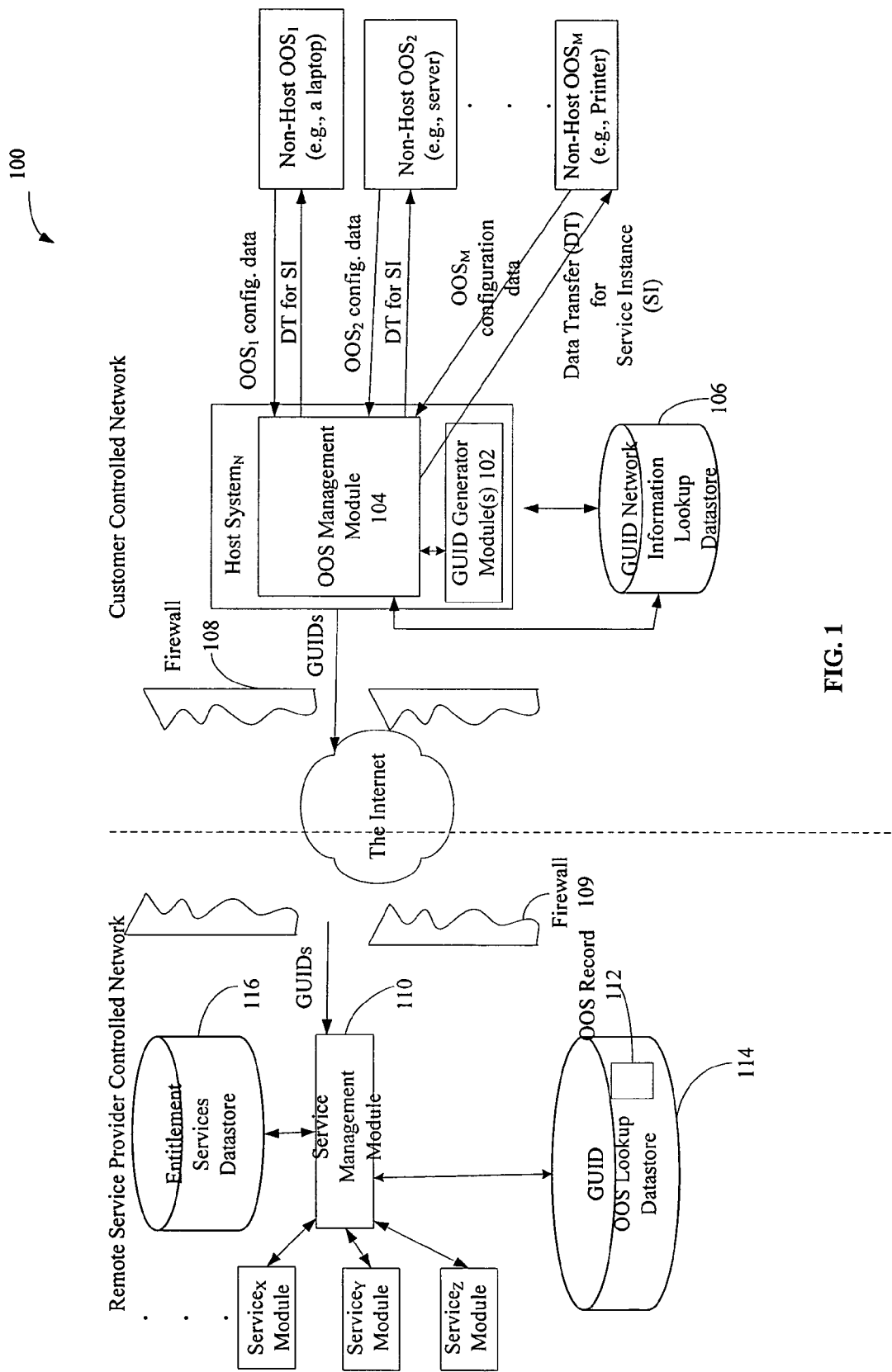
FIG. 1 is a functional block diagram of a system for secure remote referencing by a service provider for an object of service (OOS) within a customer controlled network based on a globally unique identifier (GUID) in accordance with an embodiment of the present invention.

The figures depict embodiments of the present invention for purposes of illustration only. One skilled in the art will readily recognize from the following discussion that other embodiments of the structures and methods illustrated herein may be employed without departing from the principles of the invention described herein.

DETAILED DESCRIPTION OF THE DRAWINGS

In the embodiments discussed below, a globally unique identifier (GUID) is an identifier that is independent of a network identifier for its corresponding object of service (OOS). An example of a network identifier is an Internet Protocol (IP) address. Being independent of a network identifier means that a network identifier for the OOS cannot be reverse engineered from the GUID itself. Furthermore, a reference from the GUID to an OOS's actual IP address(es) and/or hostname(s) is stored on the customer site meaning stored in a datastore within the customer's internal or controlled network which typically has network security to prevent unauthorized access, and the OOS's actual IP address (es) and/or hostname(s) do not leave the customer's network for remote service instances. The remote service provider uses the unique identifier as a replacement for the IP address/hostname and still is able to address an individual object of service at a customer site.

There are a variety of ways for generating a GUID that does not provide the capability of reverse engineering a network identifier (e.g., an IP address). In one example, the GUID is a randomly generated number. In another example, a GUID can be based on information describing the OOS but that information does not include network information. For example, a checksum of a product's serial number, product number, and model number can be used as the GUID. Even if reverse engineered, there is no network information for the OOS to be derived from the checksum.

Here is an illustrative example of creating a GUID using a Unix-based command in which the "#" is a command prompt:
cksum
USPT07777
C9148A
HP LaserJet 4100 MFP
<CNTL>D
2711071440
In this example, the keys or parameters upon which the GUID is based are USPT07777 which is the serial number, C9148A which is the product number, and "HP LaserJet 4100 MFP" which is the model number. The <CNTL>D (control D) tells the cksum command that this is the end of the information for the checksum. The result from the checksum command, 2711071440, is a unique number that can be used as a GUID for this OOS.

FIG. 1 is a functional block diagram of a system 100 for secure remote referencing by a service provider for an object of service (OOS) controlled within a customer controlled network based on a globally unique identifier (GUID) in accordance with an embodiment of the present invention. From the perspective of a customer controlled network, the system 100 comprises an OOS management module 104, one or more GUID generator module(s) 102, and a GUID network information lookup datastore 106. As a new OOS is configured in the customer controlled network, the OOS management module 104 requests a communicatively coupled GUID generator module 102 to create a GUID for the OOS. There can be multiple GUID generator modules, for example, one for printers, one for Windows-based system, one for UNIX-based systems, one for storage devices, etc. A globally unique identifier (GUID) generator module 102 generates a GUID for each OOS which is independent of network identifying information for the OOS. The GUID generator module 102 stores the GUID with a reference to its network information in a GUID network information lookup datastore stored in a memory to which the security features of the customer controlled network controls access. In one embodiment, only the GUID generating module 102 and the OOS Management Module 104 are allowed access.

The OOS management module 104 also has access to the GUID network information lookup datastore 106 and sends a GUID for an OOS outside the customer controlled network for a service instance to a service management module 110 in the remote service provider controlled network to which it is coupled via the Internet. When data for a service instance, (e.g., a firmware upgrade or download a Java application on a printer) is received from the remote service provider network, the OOS Management Module 104 matches a GUID in the received data with its corresponding OOS based on the GUID network information lookup datastore 106. When a GUID has been newly created for an OOS or the configuration data for an OOS has changed, the configuration data is sent with the GUID to the remote service provider. Some examples of configuration data for an OOS are the software applications it includes, its port configurations, its hardware such as a DVD drive or a being a color printer as well as model and serial number information. In one embodiment, the OOS Management Module 104 always transfers the configuration data with the GUID.

In this example, the GUID generator 102 and the OOS Management Module 104 are operating on a representative Host System$_N$ networked through a firewall 108 over the Internet to the remote service provider controlled network and also networked within the firewall 108 to a plurality of illustrative examples of Non-Host OOSs such as a laptop computer Non-Host OOS$_1$, a server computer Non-Host OOS$_2$ and a Non-Host OOS$_M$ as a printer. The customer side GUID processing modules 102 and 104 can be located as different instantiations on different hosts or be centralized on a central host system for interacting with the remote service provider.

From the perspective of the remote service provider controlled network, the system 100 for secure referencing comprises a service management module 110 for interfacing with the customer controlled network for service instances for its devices and/or other OOSs. The service management module 110 cross references the corresponding OOS using the received GUID in an accessible GUID OOS Lookup Datastore 114 local to the remote service provider controlled network and under its security protections such as the firewall 109. Each OOS for the customer under a service contract has a GUID for it and an associated OOS$_N$ record including configuration data for the OOS$_N$. The Service Management Module 110 has access to an entitlement services datastore 116 in which the GUID cross references the support services to which this OOS is entitled under the customer's contract to determine whether this service instance can be satisfied. Alternatively, the entitlement services datastore 116 can be accessed if the record for the OOS indicates this is a service not previously indicated as entitled in the OOS record 112. Based on this entitlement information, the service management module 110 forwards the GUID for the service instance to the appropriate service module as illustrated by the representative communicatively coupled service$_X$, service$_Y$ and service$_Z$ modules or returns a message including the GUID to the OOS management module 104 indicating the service instance could not be completed.

Each of the modules illustrated in FIG. 2 or a portion thereof can be implemented in software suitable for execution on a processor and storage in a computer-usable medium, hardware, firmware or any combination of these. Computer-usable media include any configuration or medium capable of storing or transferring programming, data, or other digital information. Examples of computer-usable media include a data transmission as well as various memory embodiments such as random access memory and read only memory, which can take a variety of forms, some examples of which are a hard disk, a disk, flash memory, or a memory stick.

FIG. 2 is a flowchart diagram of a method 200 for assigning a globally unique identifier (GUID) to an object of service (OOS) for secure servicing by a remote service provider over a network in accordance with an embodiment of the present invention. For illustrative purposes only and not to be limiting thereof, the method embodiment 200 is discussed in the context of the system embodiment 100 of FIG. 1. The GUID generator module 102 generates 202 a GUID for an OOS which is independent of network identifying information for the OOS, stores 204 the GUID as a reference to the network information for the OOS locally within the customer controlled network, and sends 206 the GUID and configuration data for the OSS for a service instance outside the customer controlled network to a remote support service management system.

FIG. 3 is a flowchart diagram of a method 300 for secure remote referencing of an OOS in a customer controlled network by a remote support service provider based on a globally unique identifier (GUID) in accordance with an embodiment of the present invention. For illustrative purposes only and not to be limiting thereof, the method embodiment 300 is discussed in the context of the system embodiment 100 of FIG. 1. The service management module 110 receives 302 a GUID for the OOS in a data transfer for a service instance and references 304 the service related configuration data for the OOS (e.g. GUID OOS datastore 114) using the GUID. The service management module 110 retrieves 306 service entitlement information for the OOS (e.g., from the entitlement services datastore 116) using the GUID as a reference and determines 308 whether the service instance can be completed based on the service entitlement information derived from the customer's contract. Responsive to a negative determination, the service management module 110 sends a message including the GUID to the OOS Management Module 104 indicating the service could not be completed in the customer controlled network. Responsive to a positive determination, the service management module 110 processes 312 the service instance for the OOS using the GUID as an identifier for the OOS in communications with the OOS management module 104 in the customer controlled network.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the hereto appended claims. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

What is claimed is:

1. A system for secure remote referencing by a service provider in a service provider controlled network of an object of service (OOS) controlled within a customer controlled network comprising:

in the customer controlled network:
    a globally unique identifier (GUID) generator module for generating a GUID for each OOS which is independent of network identifying information for the OOS, the GUID generator module operating within the customer controlled network;
    a memory configured for access only from within the customer controlled network, a GUID network information lookup datastore stored in the memory; and
    an OOS management module operating within the customer controlled network having access to the GUID network information lookup datastore and also communicatively coupled to the remote service provider, the OOS management module sending a GUID for an OOS outside the customer controlled network in response to a request from the remote service provider and for matching a GUID received from the remote service provider with its corresponding OOS based on the GUID network information lookup datastore;
    wherein the OOS management module is configured to send configuration data for an OOS to the remote service provider, based on the configuration data having changed; and in the service provider controlled network:
    a memory configured for access only by the service provider, the memory containing:
        a globally unique identifier (GUID) OOS lookup datastore, not configured to store OOS network identifying information, linking a GUID for each OOS which is independent of network identifying information to an identification record for the OOS; and
        configuration data for the OOS received from the OOS management module; and
    an OOS lookup module for comparing a received GUID against a GUID OOS, the OOS lookup module operating under the control of the service provider and being communicatively coupled to receive the GUID from the OOS management module.

2. The system of claim 1, wherein access to the memory is restricted to the GUID generator module and the OOS management module.

3. The system of claim 1, wherein the OOS management module sends OOS configuration data with the GUID.

4. The system of claim 1, wherein the GUID generator module generates the GUID for an OOS based on one of a randomly generated number and information describing the OOS that does not include network information.

5. The system of claim 1, wherein the GUID sent outside the customer controlled network includes neither an internet protocol address nor a hostname of the OOS.

6. The system of claim 1, wherein the configuration data comprises at least one of a software application of the OOS, a port configuration of the OOS, a hardware device of the OOS, and a serial number of the OSS.

7. A system for secure remote referencing by a service provider in a service provider controlled network of an object of service (OOS) controlled within a customer controlled network comprising:

a memory, in the service provider controlled network, configured for access only by the service provider, the memory contains:
    a globally unique identifier (GUID) OOS lookup datastore linking a GUID for each OOS which is independent of network identifying information to an identification record for the OOS; and
    configuration data for the OOS received from an OOS management module operating within the customer controlled network;

an OOS lookup module, in the service provider controlled network, for comparing a received GUID against a GUID OOS, the OOS lookup module operating under the control of the service provider and being communicatively coupled to receive the GUID from the OOS management module;

wherein the service provider controlled network is separate from the customer controlled network; and wherein the OOS lookup datastore is not configured to store network identifying information for the OOS.

8. The system of claim 7 in which the identification record for the OOS comprises service governing parameters covering support services which the OOS is entitled to receive from the service provider.

9. The system of claim 8 further comprising a service management module communicatively coupled to receive the identification record for the OOS from the OOS lookup module, the service management module determines what services are to be provided for the OOS based on the service governing parameters.

10. The system of claim 9 wherein the service governing parameters include customer Information.

11. The system of claim 9 wherein the service governing parameters include a contract identifier for a service contract covering the OOS, and the service management module retrieves the service contract by indexing into a contract datastore with the contract identifier.

12. The system of claim 7, wherein the identification record for the OOS includes configuration data for the OOS.

13. The system of claim 9, further comprising a service module to which the service management module sends the GUID for the service instance based on the support services to which the OOS is entitled.

14. The system of claim 9, wherein the service management module sends a message including the GUID to the OOS management module in the customer controlled network based on a determination that a service instance cannot be completed.

15. The system of claim 7, wherein the configuration data comprises at least one of a software application of the OOS, a port configuration of the OOS, a hardware device of the OOS, and a serial number of the OSS.

16. A method for secure remote referencing using a globally unique identifier (GUID) by a remote service provider of an object of service (OOS) controlled within a customer controlled network comprising:

in the remote service provider:
receiving, by a processor, a GUID for the OOS in a data transfer for a service instance from an OOS management module operating within the customer controlled network and configured to match the GUID and the OSS;

storing service related configuration data for the OOS received from the OOS management module;

referencing, by the processor, the service related configuration data for the OOS based on the GUID;

retrieving service entitlement information for the OOS based on the GUID;

determining, by the processor, whether the service instance can be completed based on service entitlement information; and responsive to a positive determination, processing, by the processor, the service instance for the OOS using the GUID as an identifier for the OOS in communications transferred to the customer controlled network;

wherein the processing comprises communicating with the OOS without network identifying information for the OOS.

17. A non-transitory computer usable medium storing software for causing a processor to execute a method for secure remote referencing using a globally unique identifier (GUID) by a remote service provider of an object of service (OOS) controlled within a customer controlled network, the method comprising:

in the remote service provider:
receiving a GUID for the OOS in a data transfer for a service instance from an OOS management module operating within the customer controlled network and configured to match the GUID and the OSS;

storing service related configuration data for the OOS received from the OOS management module;

referencing the service related configuration data for the OOS based on the GUID;

retrieving service entitlement information for the OOS based on the GUID;

determining whether the service instance can be completed based on service entitlement information; and responsive to a positive determination, processing the service instance for the OOS using the GUID as an identifier for the OOS in communications transferred to the customer controlled network;

wherein the processing comprises communicating with the OOS without network identifying information for the OOS.

* * * * *

UNITED STATES PATENT AND TRADEMARK OFFICE
CERTIFICATE OF CORRECTION

| | | |
|---|---|---|
| PATENT NO. | : 7,913,308 B1 | |
| APPLICATION NO. | : 11/263680 | |
| DATED | : March 22, 2011 | |
| INVENTOR(S) | : Michael J. Hardcastle | |

It is certified that error appears in the above-identified patent and that said Letters Patent is hereby corrected as shown below:

In column 6, line 50, in Claim 6, delete "OSS." and insert -- OOS. --, therefor.

In column 7, line 19, in Claim 10, delete "Information." and insert -- information. --, therefor.

In column 7, line 39, in Claim 15, delete "OSS." and insert -- OOS. --, therefor.

In column 8, line 2, in Claim 16, delete "OSS;" and insert -- OOS; --, therefor.

In column 8, line 29, in Claim 17, delete "OSS;" and insert -- OOS; --, therefor.

Signed and Sealed this
Fifth Day of July, 2011

David J. Kappos
*Director of the United States Patent and Trademark Office*